Jan. 27, 1970   F. W. NEELD, JR., ET AL   3,491,393
SUSPENSION BRIDGE CABLE CONSTRUCTION AND SUPPORT ASSEMBLY
Filed Oct. 18, 1967

INVENTORS
Frank W. Neeld Jr.
Jackson L. Durkee

United States Patent Office 3,491,393
Patented Jan. 27, 1970

3,491,393
SUSPENSION BRIDGE CABLE CONSTRUCTION
AND SUPPORT ASSEMBLY
Frank W. Neeld, Jr., Riegelsville, and Jackson L. Durkee, Bethlehem, Pa., assignors to Bethlehem Steel Corporation, a corporation of Delaware
Filed Oct. 18, 1967, Ser. No. 676,296
Int. Cl. E01d 11/00
U.S. Cl. 14—22          3 Claims

ABSTRACT OF THE DISCLOSURE

A cable support assembly for suspension bridge cables, especially cables constructed of shop-fabricated parallel wire strands. The cable is held in a flat-bottomed trough between upwardly converging sidewalls of a cast saddle. The portion of the cable within the trough is constructed from strands which are shaped into flat layers parallel to the horizontal axis of the cable. Sheet metal separators are placed between adjacent layers. Wedge shaped filler members and shims are used to fill the spaces between the strands and the sidewalls of the saddle in the upper layers of strands making up the cable.

Background of the invention

This invention relates to suspension bridges and more particularly to the saddles which form a seat for the main cables as they pass over the supporting towers. The saddles serve to transfer the weight of the cables and their suspended loads to the towers in a vertical direction.

The main cables for suspension bridges are usually comprised of large numbers of high strength galvanized steel wires arranged parallel to each other in groups or strands which are in turn compacted to form a large diameter cable. Heretofore the individual wires have been individually erected, or "spun" back and forth between the cable anchorages, and gathered into strands which are then compacted to form a cable. Recently apparatus and methods have been developed and are described in assignee's copending U.S. patent application Ser. No. 575,038, filed Aug. 25, 1966, which permits the shop fabrication of full length strands consisting of a plurality of individual wires laid parallel to the axis of the strand with an outer binding. This technique greatly reduces the amount of time required for field construction of the finished cable.

Heretofore the saddles were usually made with a cable retaining trough either circular in cross section, or else having round grooves machined in its bottom and sides to hold the individual strands. Such saddles were designed to accommodate large field-constructed, spun-type strands and present some difficulties for the erection of the relatively small shop-fabricated parallel wire strands. In addition, the spun-type cables constructed in such saddles generally nad a relatively high "voids ratio," or proportion of void area to total area of cable cross-section, thus tending to produce a "spongy" cable with attainment settling of wires within the saddle and loss of wire alignment.

Summary of the invention

It is therefore an object of this invention to provide a bridge cable support assembly which will permit the rapid and easy placement of individual shop-fabricated parallel wire strands in the trough of the saddles.

It is a further object of this invention to provide a method of constructing a bridge cable within the cable retaining trough of a bridge using shop-fabricated parallel wire strands which will produce a cable with the individual wires in a high degree of parallel alignment within the saddles, and with an excellent filling of all voids.

Other and further objects of the invention will become apparent from the following description and the accompanying drawings and claims.

It has been discovered that the foregoing objects can be attained by a bridge cable assembly in which the saddle has a flat-bottomed trough formed between a pair of upwardly converging sidewalls. The cable is constructed within the trough from a plurality of strands which are shaped into flat layers parallel to the horizontal centerline of the cable with sheet-metal separators between successive layers. Wedge-shaped filler members and shims are positioned between the strands and the converging sidewalls of the saddle in the upper layers of strands.

Description of the preferred embodiments

Referring to the figures, the saddle 1 is a one piece steel casting which is designed to rest upon and be attached to the tops of the bridge towers 20. A trough 2 for retaining cable 3 is formed in the top of the saddle 1 and extends from end to end of the saddle 1 in a smooth single radius or compound curve.

Figure 2:
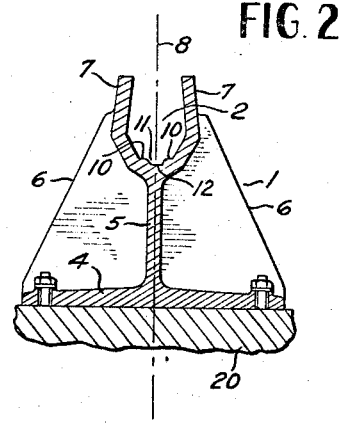
FIGURE 2 is a cross-section of the saddle with the cable omitted.
Figure 3:
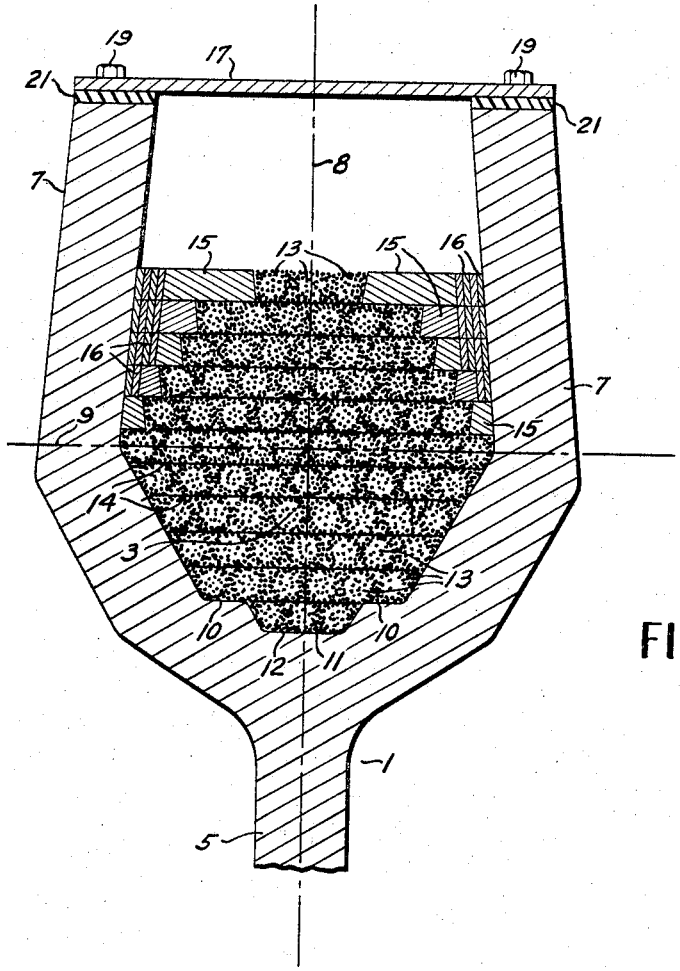
FIGURE 3 is an enlarged section taken along line 3—3 of FIGURE 1.

Referring particularly to FIGURE 2, the saddle 1 is comprised of a base flange 4, a central web member 5 and a plurality of closely spaced stiffener plates 6. The cross-sectional shape of the cable retaining trough 2 formed between a pair of upstanding sidewalls 7 comprises a series of planar surfaces, symmetrical about the vertical centerline 8 of the cable 3. The sidewalls 7 of trough 2 converge slightly above the horizontal centerline 9 of the cable 3 and also converge to a greater degree below the horizontal centerline 9 of the cable 3 as best shown in FIGURE 3. As the sidewalls 7 approach web member 5, they form one or more substantially horizontal surfaces 10 parallel to the horizontal centerline 9 of the cable 3. In the embodiment shown in FIGURES 2 and 3, the horizontal surfaces 10 are separated by a shallow trapezoidal recess 11, the bottom surface 12 of which is also horizontal. It is important that at least one substantially horizontal surface is provided at the bottom of the trough 2.

The strands 13 making up cable 3 are laid one at a time in trough 2. In the embodiment shown the first three strands 13 are laid in the trapezoidal recess 11. The tops of the strands are pressed or pounded until they are shaped into a compact flat layer of parallel wires whose top surface is flush with horizontal surfaces 10 and parallel to the horizontal centerline 9 of the cable. Sheet metal separators 14 are placed on this layer and also on top of each subsequent layer except for the top layer, to permit easy transverse movement and positioning of the strands when building up a layer, and also to permit succeeding strands 13 to be drawn easily in the longitudinal direction over the top surface of the layer of strands underneath without disturbing previously adjusted strands. Additional layers of strands 13 are then laid on top of this initial layer until the layer which includes or is adjacent to the horizontal centerline 9 of the cable 3 has been laid.

Starting with the layer immediately above the horizontal centerline 9 of the cable, zinc wedge-shaped filler members 15 and zinc shims 16, as necessary, are placed against the converging sidewalls 7, before placing the strands 13 which will make up that layer. The filler members 15 and shims 16 permit a means of adjusting the thickness of these layers when the strands are compacted and shaped into a flat layer so that the finished cable will have the desired vertical dimension in the saddle. When the strands 13 are in place, the filler members 15 and shims 16 are unable to move out of position because of the wedge shaped configuration of the filler members 15 and shims 16 bearing against the converging sidewalls 7 of the saddle 1. After the last strand is in place and the cable completed, a sealing gasket 21 and a metal cover plate 17 are put over the trough 2 between the tops of the sidewalls 7 and bolted in place.

Figure 1:
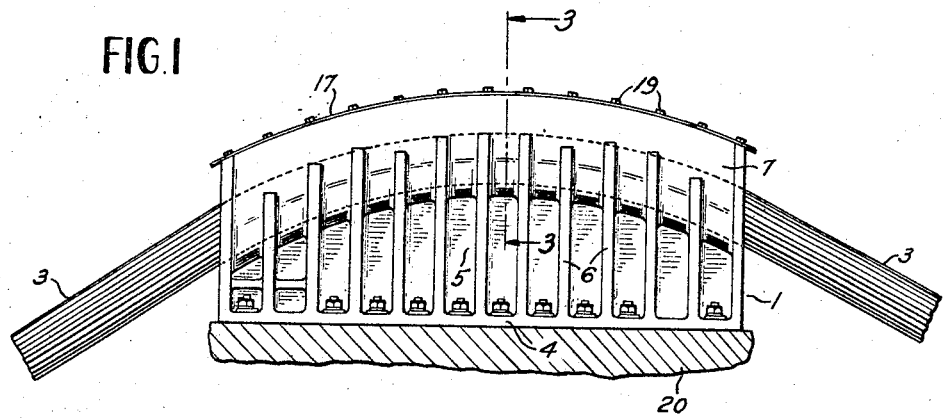
FIGURE 1 is a side elevation of a tower saddle showing a portion of the finished cable.

The cable shown in FIGURES 1 and 3 is comprised of seventy-six strands each of which is comprised of sixty-one parallel wires.

We claim:

1. A method of constructing a suspension bridge cable within the cable retaining trough of a bridge saddle using shop-fabricated parallel wire strand wherein each strand comprises a plurality of parallel wires bound together by constraining means, said method comprising the steps of:
    (a) placing several strands in the bottom of said trough to form a layer;
    (b) removing said constraining means from that portion of the strands within said trough;
    (c) applying a pressure force to the tops of the several strands in the layer to displace the individual wires of said strands to form a layer of closely spaced parallel wires whose top surface is substantially flat and horizontal in transverse cross-section;
    (d) placing a sheet metal separator on top of said layer;
    (e) placing an additional layer of strands on top of said separator;
    (f) repeating steps (b) through (e) until all the strands have been placed.

2. The method of claim 1 in which the pressure force is applied by pounding the tops of the strands in each layer.

3. The method of claim 1 in which the thickness of a layer is controlled by placing filler members and shims of predetermined thickness between the strands and the sidewalls of the cable retaining trough.

References Cited

UNITED STATES PATENTS

| 1,678,292 | 7/1928 | Howe | 14—22 |
| 2,011,168 | 8/1935 | Sunderland | 14—22 |
| 2,118,187 | 5/1938 | Fine | 14—22 |
| 2,748,407 | 6/1956 | Copp | 14—22 |

FOREIGN PATENTS 759,490  11/1951  Germany.

OTHER REFERENCES

Engineering News-Record, Jan. 14, 1932, p. 47.

JACOB L. NACKENOFF, Primary Examiner